United States Patent
De Jager et al.

(10) Patent No.: US 12,352,001 B2
(45) Date of Patent: Jul. 8, 2025

(54) VIBRATORY HAMMER WITH ELECTRIC MOTOR

(71) Applicant: ELECTRIC FOUNDATION EQUIPMENT B.V., Klundert (NL)

(72) Inventors: Daniël De Jager, Hendrik Ido Ambacht (NL); Adis Bajric, Breda (NL); Joannes Christoffel Werri, Kwadendamme (NL); Alexander Jorissen, Loosdrecht (NL)

(73) Assignee: Electric Foundation Equipment B.V., Klundert (NL)

( * ) Notice: Subject to any disclaimer, the term of this patent is extended or adjusted under 35 U.S.C. 154(b) by 206 days.

(21) Appl. No.: 18/018,171

(22) PCT Filed: Jul. 26, 2021

(86) PCT No.: PCT/EP2021/070836
§ 371 (c)(1),
(2) Date: Jan. 26, 2023

(87) PCT Pub. No.: WO2022/023254
PCT Pub. Date: Feb. 3, 2022

(65) Prior Publication Data
US 2023/0265631 A1    Aug. 24, 2023

(30) Foreign Application Priority Data
Jul. 30, 2020   (NL) ...................................... 2026179

(51) Int. Cl.
*E02D 7/18*     (2006.01)
*E02D 11/00*    (2006.01)
*H02K 19/02*    (2006.01)

(52) U.S. Cl.
CPC ............. *E02D 11/00* (2013.01); *H02K 19/02* (2013.01)

(58) Field of Classification Search
CPC ........... E02D 11/00; E02D 7/18; E02D 13/02; H02K 19/02; B06B 1/166
See application file for complete search history.

(56) References Cited

U.S. PATENT DOCUMENTS

| | | |
|---|---|---|
| 3,280,924 A | 10/1966 | Pavlovich |
| 3,502,160 A | 3/1970 | Herz |

(Continued)

FOREIGN PATENT DOCUMENTS

| | | |
|---|---|---|
| CN | 204068578 | 12/2014 |
| CN | 110401308 A | 11/2019 |

(Continued)

OTHER PUBLICATIONS

Netherlands Search Report dated Apr. 21, 2021, for Netherlands Application No. 2026179.

(Continued)

*Primary Examiner* — Carib A Oquendo
(74) *Attorney, Agent, or Firm* — Patterson + Sheridan, LLP

(57) ABSTRACT

A vibratory hammer (1) for driving or retracting sheet piles, pipes or other elements into or from the soil, comprises a vibration case (2). A clamp (17) is attached to the vibration case (2). The clamp (17) comprises gripping jaws (18) for gripping the sheet piles or other elements. A yoke (3) is connected to the vibration case (2) via one or more vibration damping elements for suspending the vibratory hammer (1) from a hoist cable or the like. In the vibration case (2) an even number of pairwise arranged eccenter weights are rotationally mounted. The vibratory hammer comprises at least one synchronous electric motor (13A) for driving the rotation of the eccenter weights.

15 Claims, 4 Drawing Sheets

(56) References Cited

U.S. PATENT DOCUMENTS

| | | | | |
|---|---|---|---|---|
| 3,828,864 | A | * | 8/1974 | Haverkamp .............. E02D 7/18 173/112 |
| 4,143,719 | A | * | 3/1979 | Furukawa ................ E02D 7/18 173/101 |
| 5,355,964 | A | * | 10/1994 | White ...................... E02D 7/18 173/1 |
| 7,080,958 | B1 | * | 7/2006 | Morris ..................... E02D 9/02 173/210 |
| 7,913,771 | B2 | * | 3/2011 | White ...................... E02D 7/18 173/49 |
| 9,873,997 | B2 | * | 1/2018 | Van Es .................... E02D 7/18 |
| 2011/0110725 | A1 | * | 5/2011 | Evarts ..................... E02D 7/18 405/232 |

FOREIGN PATENT DOCUMENTS

| | | |
|---|---|---|
| DE | 202007018580 U1 | 11/2008 |
| DE | 102011103401 B4 | 11/2018 |
| EP | 0473449 A1 | 3/1992 |
| WO | 2011056910 A1 | 5/2011 |

OTHER PUBLICATIONS

PCT International Search Report and Written Opinion dated Sep. 23, 2021, for International Application No. PCT/EP2021/070836.

Gieras, Jacek F.—Magnet Motor Technology—Design and Applications, Third Edition, CRC Press, Taylor & Francis Group, 2010, Ch. 1—Introduction, pp. 1-26, Ch. 5—Permanent Magnet Synchronous Motors, pp. 171-199, and Ch. 7—Axial Flux Motors, pp. 305-340.

Bingham, Christopher M., et al.—"Amplitude and Frequency Control of a Vibratory Pile Driver," IEEE Transactions on Industrial Electronics, vol. 47, No. 3, Jun. 2000, pp. 623-631.

Bistak, Steve, et al.—"AC Inductions Motors vs. Permanent Magnet Synchronous Motors," Motors & Drives (https://empoweringpumps.com/blog/category/motors/), Jan. 23, 2017, 6 pages.

Derammelaere, Stijn, et al.—"A quantitative comparison between BLDC, PMSM, Brushed DC and Stepping Motor Technologies," 19th International Conference on Electrical Machines and Systems (ICEMS), Nov. 13-16, 2016, 5 pages.

ElectricityShock—"Advantages and disadvantages of permanent magnet synchronous motor," Electricity Shock—Electrical & Electronic Tutorials, https://electricityshock.com/advantages-and-disadvantages-of-permanent-magnet-synchronous-motor/, webpages downloaded Jul. 27, 2023, 6 pages.

Embitel—"Brushless DC Motor vs PMSM: Find Out Now These Motors and Their Motor Control Solutions Work," https://www.embitel.com/blog/embedded-blog/brushless-dc-motor-vs-pmsm-how-these-motors-and-motor-control-solutions-work, webpages downloaded Jul. 27, 2023, 6 pages.

Munz, Rick—"Popularity of permanent magnet motors on the rise," https://www.machinebuilding.net/popularity-of-permanent-magnet-motors-on-the-rise, webpages downloaded Jul. 27, 2023, posted to Technical (new/technical) on Feb. 21, 2014, 8 pages.

EPO Third Party Observation dated Jul. 6, 2023, for European Application No. 21746760.4.

Wikipedia—Brushless electric motor, http://web.archive.org/web/20161125091033/https://en.wikipedia.org/wiki/Brushless_electric_motor . . . (Jul. 24, 2023), 2 pages.

* cited by examiner

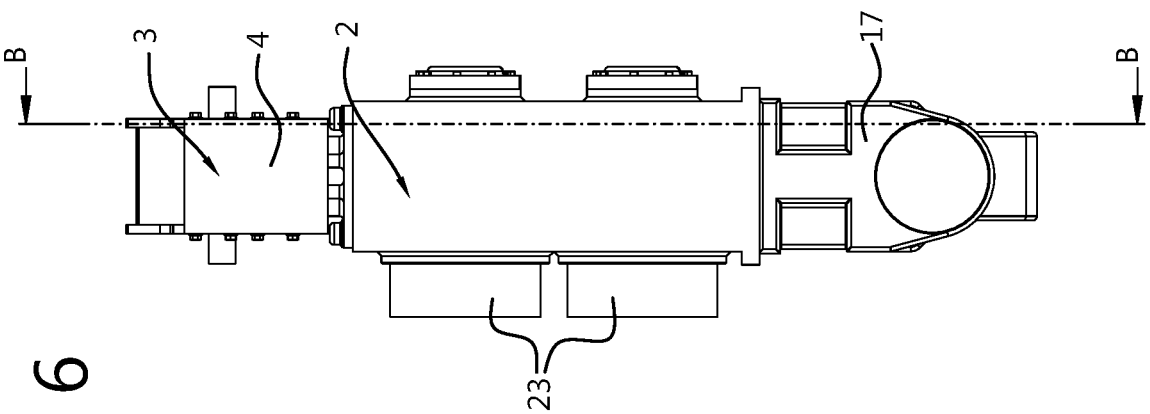
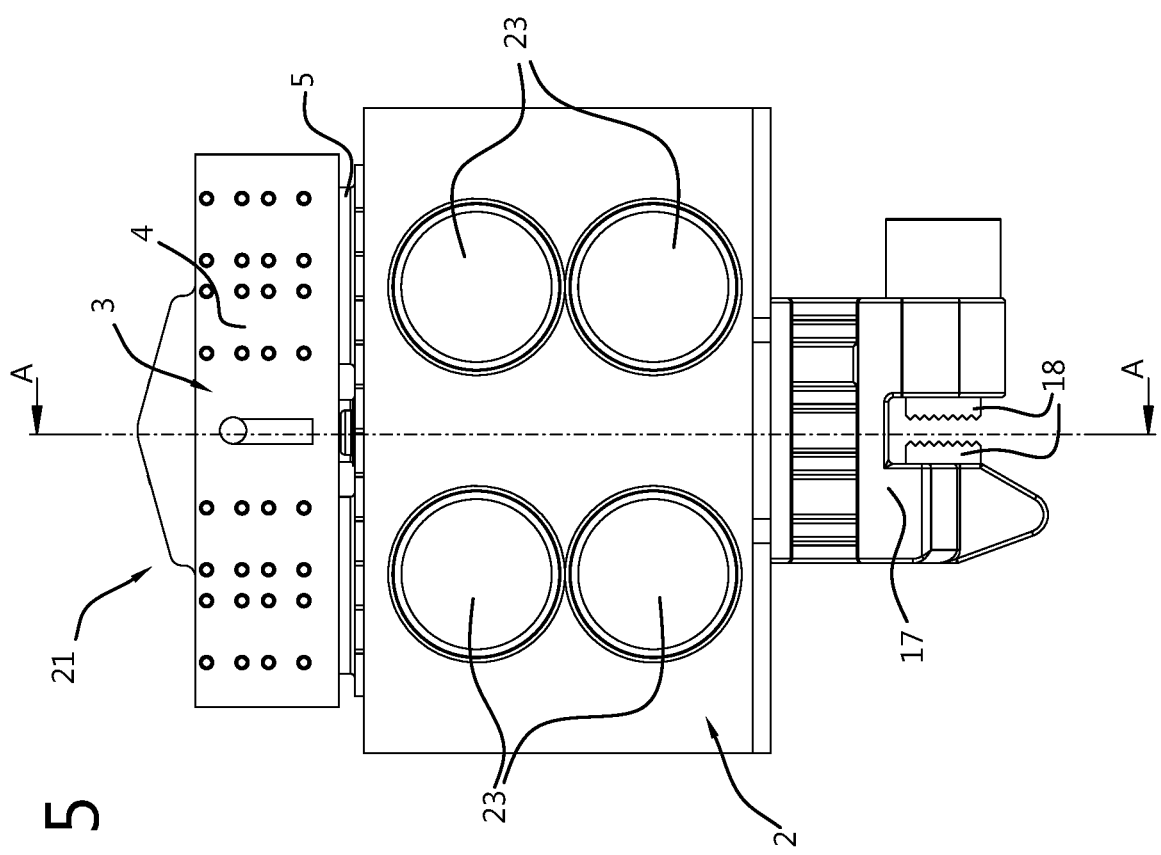

VIBRATORY HAMMER WITH ELECTRIC MOTOR

FIELD OF THE INVENTION

The invention relates to a vibratory hammer for driving or retracting sheet piles, pipes or other elements into or from the soil.

Such a vibratory hammer comprises:
a vibration case;
an even number of pairwise arranged eccenter weights, which are rotationally mounted in the vibration case;
at least one drive motor for driving the rotation of the eccenter weights;
a clamp attached to the vibration case, said clamp comprising gripping jaws for gripping the sheet piles, pipes or other elements; and
a yoke for suspending the vibratory hammer from a hoist cable on a rig, a crane or the like, said yoke being connected to the vibration case via one or more vibration damping elements.

BACKGROUND OF THE INVENTION

Vibratory hammers are known in the art for driving or retracting sheet piles, pipes, columns etc. in the soil. The vibratory hammer is in practice suspended from a crane or rig or a similar device. A sheet pile, for example, is gripped by the clamp and placed on the soil. By operating the eccenter weights in the vibration case, vibrations are generated which are transferred from the vibration case via the clamp into the sheet pile and into the surrounding soil.

Conventionally the vibratory hammers were equipped with hydraulic motors for driving the rotation of the eccenter weights. An example of such a vibratory hammer is shown in US 2015/0027744 A1. This so called vibro hammer includes an upper and a lower weight set which are each driven by a hydraulic motor. The weight sets are mutually coupled by a transmission device by means of which the phase angle between the weight sets can be changed. The hydraulic motors advantageously provide a high power, while being relatively compact.

As an alternative to hydraulically driven vibratory hammers there have been proposed electrically driven vibratory hammers. The advantage being that no hydraulic power system is necessary, which makes the apparatus more efficient, less complex to manufacture and reduces maintenance.

In particular it is known to equip a vibratory hammer with asynchronous electric motors. An example of such a vibratory hammer is disclosed in DE 10 2011 103 401 B4. In this particular vibratory hammer the eccenter weights are arranged in two pairs. Each eccenter weight is driven by a separate asynchronous electric motor directly coupled to the eccenter shaft of the respective eccenter weight. The phase angle between the eccenter weights is electronically adaptable in this specific vibratory hammer. Although a direct coupling of the separate asynchronous motors with the shafts of the eccenter weights is quite appealing in view of simplicity of construction and the omission of a hydraulic system and transmission parts which are prone to wear and need maintenance, this known vibratory hammer is quite bulky compared to hydraulically driven vibratory hammers, whilst the electrically driven vibratory hammer is able to provide much less power than the (smaller) hydraulically driven vibratory hammer. This known electrically driven vibratory hammer is therefore only usable for relatively light applications. Moreover, a more bulky vibratory hammer is more difficult to maneuver in place to position a sheet pile or other element which impairs the practical use of this electrically driven vibratory hammer.

There are also known heavier electrically driven vibratory hammers to fulfil higher power requirements, However, in that case the larger asynchronous motors are placed on top of the vibratory casing, wherein the eccenter weights are driven by the motors via an endless belt transmission. Such a vibratory hammer is for example shown in CN 102839667.

The present invention has for an object to provide an alternative vibratory hammer.

This object is achieved by a vibratory hammer according to the invention.

SUMMARY OF THE INVENTION

A vibratory hammer for driving or retracting sheet piles, pipes or other elements into or from the soil, said vibratory hammer comprising:
a vibration case;
an even number of pairwise arranged eccenter weights, which are rotationally mounted in the vibration case;
at least one drive motor for driving the rotation of the eccenter weights;
a clamp attached to the vibration case, said clamp comprising gripping jaws for gripping the sheet piles, pipes or other elements; and
a yoke for suspending the vibratory hammer from a hoist cable or the like, said yoke being connected to the vibration case via one or more vibration damping elements, wherein the at least one drive motor is a synchronous electric motor.

In particular the synchronous electric motor is a permanent magnet synchronous motor (PMSM).

The synchronous motor, in particular the PMSM, provides a far more compact design to vibratory hammer whilst the power it provides approximates the power density (power per unit volume–$W/m^3$) of the hydraulically driven vibratory hammers.

The PMSM may be of the axial flux type or of the radial flux type. The motor may be air cooled or water cooled.

The PMSM's of a radial or axial flux type have the possibility to operate at much higher speeds than standard hydraulic motors (10.000 rpm for the PMSM vs. 3000 rpm for the hydraulic motor). This offers the opportunity to vibrate with the same centrifugal force but with a lower inertia.

The at least one drive motor is preferably attached to the vibration case. The vibration case has a front side and a back side perpendicular to the eccenter shafts of the eccenter weights. The PMSM has a very limited dimension in the direction of its centre axis; in other words it is relatively flat. Thereby the PMSM can be arranged on the outer side on the front or back side of the vibration case without the PMSM extending the dimension of the case in the direction parallel to the eccenter shafts.

In another possible embodiment the motor may be integrated in the eccenter shaft, wherein stator windings would be located inside the shaft and the permanent magnets would be arranged around the windings inside the hollow shaft of the eccenter weight. In this embodiment the stator windings and the permanent magnets are thus both inside the eccenter shaft.

In a practical embodiment the vibratory hammer comprises four eccenter weights arranged in two pairs one above the other. The center axes of the eccenter weights of one pair are parallel and in use located in one substantially horizontal plane. The center axis of the eccenter weight of one pair is parallel with the center axis of the corresponding eccenter weight of the other pair and in use located in a substantially vertical plane therewith.

Notwithstanding the above also vibratory hammers with for example six, eight or even more eccenter weights are possible. Furthermore it is possible to position the pairs of eccenter weights next to each other in a horizontal direction instead of positioning one pair above the other.

The vibratory hammer may include one drive motor for each pair of eccenter weights. The eccenter weights may be mutually coupled by meshing gears connected to the corresponding eccenter shafts. The synchronous electric motor has a drive shaft which may carry a gear wheel which cooperates with one of the gear wheels mounted on the eccenter shafts.

There may be a synchronisation shaft carrying one or more synchronisation gear wheels which engage gears of two pairs of eccenter weights to synchronise the rotation of the two pairs. The synchronisation shaft may include a phase angle adjustment feature, whereby the rotational angle between two gears on the synchronisation shaft may be changed whereby the phase angle between the pairs of eccenter weight can be changed. An example of such a phase angle adjustment feature is shown in US 2015/0027744 A1.

In another possible embodiment the respective eccenter shafts may be directly connected to the drive shaft of an associated synchronous motor (PMSM). In this embodiment each eccenter shaft and corresponding eccenter weight thus has its own synchronous motor (PMSM). This allows the omission of gears or other transmission elements and the possibility to synchronise the eccenter weights by means of an electronic control system that controls the synchronous motors. Also the adjustment of the phase angle between eccenter weights in one pair may be done by the electronic control system. The adjustment of the phase angle can also be done between eccenter pairs. Thus in a possible embodiment the synchronisation between two eccenter weights of one pair can be done by a gear, while the phase angle between different pairs can be adjusted electronically by means of a control system.

In a particular embodiment a frequency drive or an inverter associated with each individual PMSM is mounted on the vibratory hammer. This reduces the number and size of electrical cables that have to run towards the vibratory hammer.

Preferably an electronic control system is provided which is connected with the frequency drive or inverter of each PMSM so as to control the synchronous motors. The control system may be configured to electronically control the phase angle between the eccenter weights. Furthermore the control system may be configured to provide a proportional control of centrifugal force and speed. Preferably the vibratory hammer is operated is controlled to operate at a constant centrifugal force, which may be set to a desired value, but with a proportional speed and thus vibration frequency. The control system thus allows to variably set the centrifugal force and to select and vary the frequency that goes therewith, maintaining a constant force.

The invention will be further described in the following detailed description of a possible embodiment with reference to the drawings.

BRIEF DESCRIPTION OF THE DRAWINGS

FIG. 5 shows a front elevational view of another vibratory hammer according to the invention, FIG. 6 shows a side elevational view of the vibratory hammer of FIG. 5.

DETAILED DESCRIPTION

Figure 1:
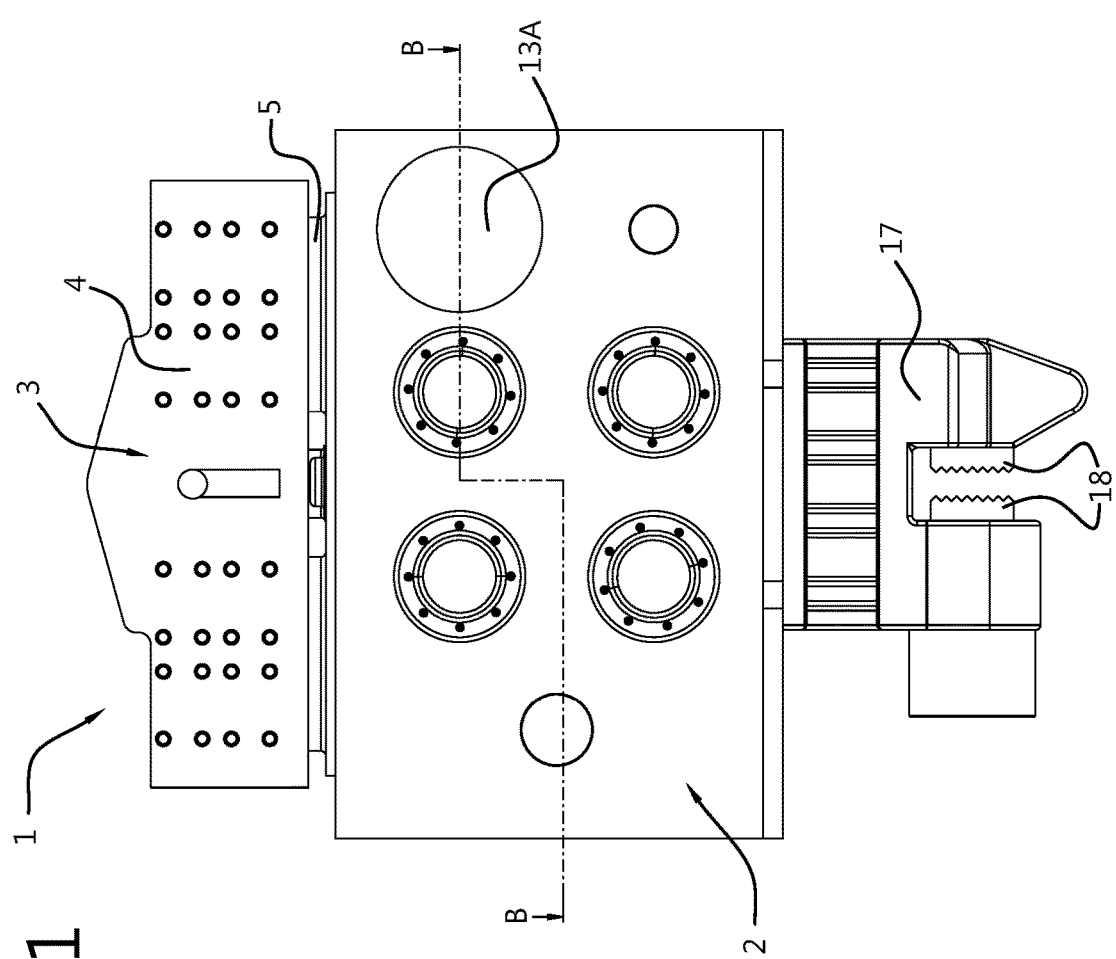
FIG. 1 shows a front elevational view of a vibratory hammer according to the invention.
Figure 2:
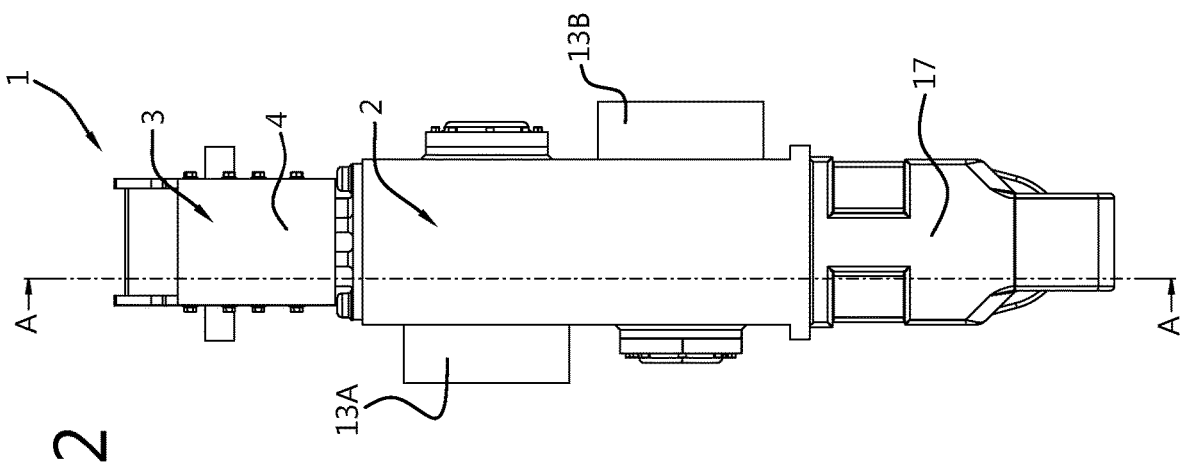
FIG. 2 shows a side elevational view of the vibratory hammer of FIG. 1.

In the FIGS. 1-4 a vibratory hammer 1 is schematically illustrated. The vibratory hammer 1 comprises a vibration case 2 and a yoke 3.

The yoke 3 is a part designed to suspend the vibratory hammer 1 from a crane, a rig or similar equipment. It comprises a member which can cooperate with a crane hook or the like to attach it to a hoisting cable. The yoke 3 in this specific embodiment comprises an outer housing 4 which includes the hook means 7 to cooperate with a hoisting hook of a crane or rig. The yoke 3 furthermore comprises an inner part 5 which is rigidly attached to the vibration case 2. The inner part 5 is received in the outer housing 4 and connected thereto via multiple vibration absorbing elements 6 for example made of an elastomer material. The vibration absorbing elements 6 prevent that vibrations generated in the vibration box 2 by operating the vibratory hammer 1, are transferred to the equipment from which the vibratory hammer 1 is suspended.

In the vibration box 2 two pairs of rotational eccenter weights are arranged, the eccenter weights of one pair being indicated by reference numeral 8A, and the eccenter weight of the other pair being indicated by reference numeral 8B. The eccenter weights 8A and 8B are each arranged on an eccenter shaft 9A and 9B, respectively. The eccenter shafts 9A, 9B are mounted in the vibration case 2 with bearings 10. Gears 11A an 11B are mounted on the eccenter shafts 9A and 9B, respectively (cf. FIG. 3). The gears 11A of the eccenter shafts 9A of an upper pair of eccenter weights 8A mesh with each other whereby the two eccenter weights 8A of the upper pair are synchronised with each other. Similarly, the gears 11B of the eccenter shafts 9B of a lower pair of eccenter weights 8B mesh with each other whereby the two eccenter weights 8B of the lower pair are synchronised with each other.

In a region of the vibration case 2 next to the pairs of eccenter weights two permanent magnet synchronous motors (PMSM) 13A and 13B are mounted to the outer side of the vibration case 2. In particular the motor 13A is arranged on the front side of the vibration case 2. The other motor 13B is arranged on the or back side of the vibration case 2. The PMSM's 13A, 13B each have a motor shaft which is connected to a respective drive shaft 12A, 12B, which is rotationally mounted in the vibration case 2. A gear wheel 14A is mounted on the drive shaft 12A. A gear wheel 14B is mounted on the drive shaft 12B. The gear wheel 14A meshes with one of the gear wheels 11A, the gear wheel 14B meshes with one of the gear wheels 11B. Thus the motor 13A is arranged to drive the upper pair of eccenter weights 8A and the other motor 13B is arranged to drive the lower pair of eccenter weights 8B.

On the other side of the pairs of eccenter weights 8B a synchronisation shaft 15 is mounted in the vibration case 2. Two gears 16A and 16B are mounted on the synchronisation shaft 15. The gear 16A meshes with one of the gear wheels 11A and the gear 16B meshes with one of the gear wheels 11B. Thus, via the synchronistaion shaft 15 the rotation of the upper pair of eccenter weights 8A is synchronised with the rotation of the lower pair of eccenter weights 8B. The gears 11A of the eccenter shafts 9A of an upper pair of eccenter weights 8A mesh with each other whereby the two eccenter weights 8A of the upper pair are synchronised with each other. During the start-up or shut down stages the rotation frequencies decrease and resonance may occur which may cause damage to the environment such as buildings nearby. The synchronisation shaft 15 may have an adjustment mechanism which allows to adjust the phase angle between the upper pair and lower pair of eccenter weights during the start-up and the shut down stage of the vibratory hammer 1, whereby the resonance of the environment can be avoided.

At a lower side of the vibration case 2 a clamp 17 is attached to the vibration case 2. The clamp 17 comprises jaws to grip an upper side of a sheet pile or another object to be driven into the soil or to be retracted from the soil. The vibrations caused by the rotating eccenter weights are transferred from the vibration case 2 through the clamp 17 into the sheet pile or other object, which thereby vibrates and loosens the soil in which it is driven or from which it is retracted.

Another possible embodiment of a vibration hammer 21 is shown in FIGS. 5-8. In this embodiment like parts are indicated by the same reference numerals as in the FIGS. 1-4 and for a description of those parts reference is made to the foregoing description. This embodiment has four permanent magnet synchronous motors 23 which are mounted to the outside of the vibration case 2 in line with the eccenter shafts 9A, 9B. In this embodiment the respective motor shafts of the synchronous motors 23 extend are directly coupled to the eccenter shafts 9A, 9B. The synchronisation between the eccenter weights 8A, 8B is done electronically via a controller that controls the synchronous motors 23. The controller may also be configured to take care of the adjustment of the phase angle between the upper and lower pair of eccenters 8A, 8B during the start-up and shut down stage of the vibratory hammer 21.

Figure 3:
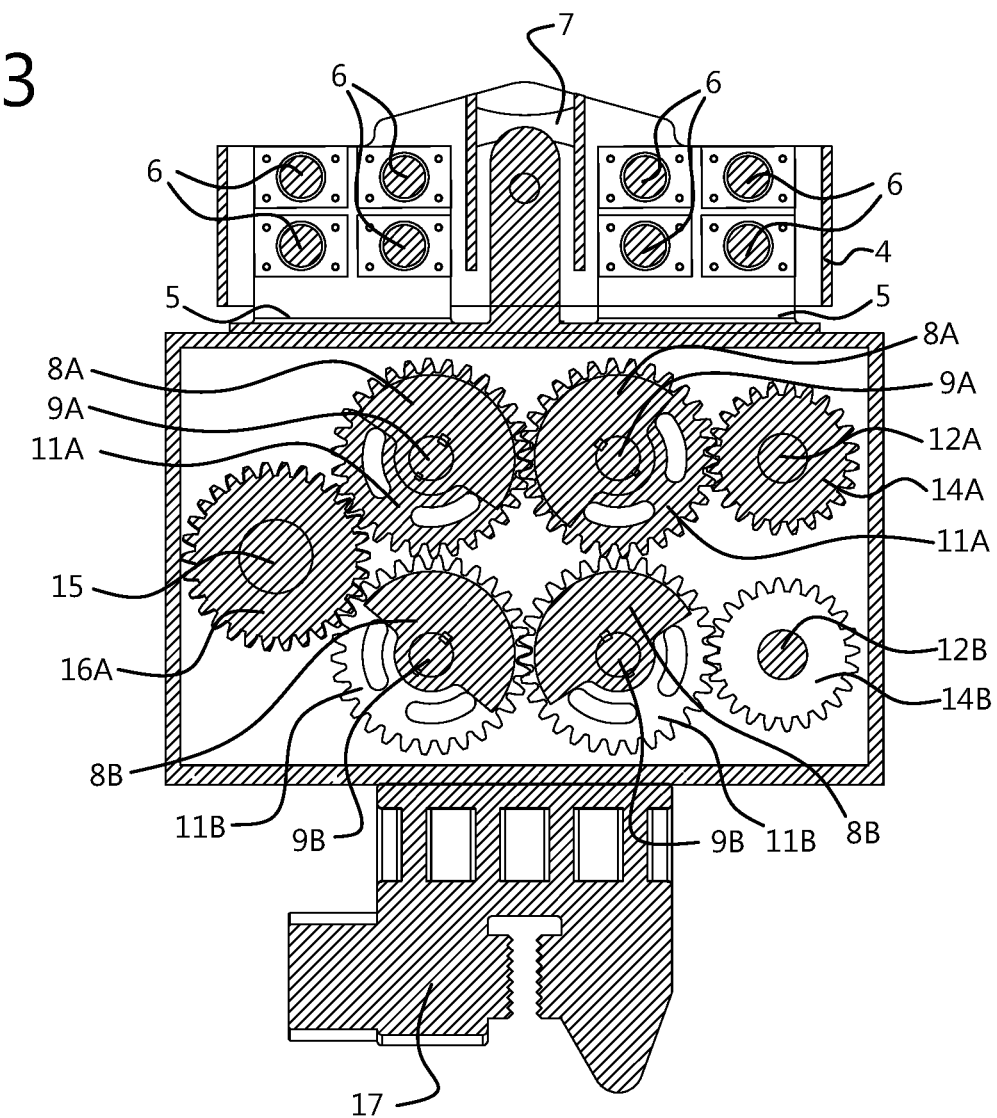
FIG. 3 illustrates a cross section through the line A-A indicated in FIG. 2.
Figure 4:
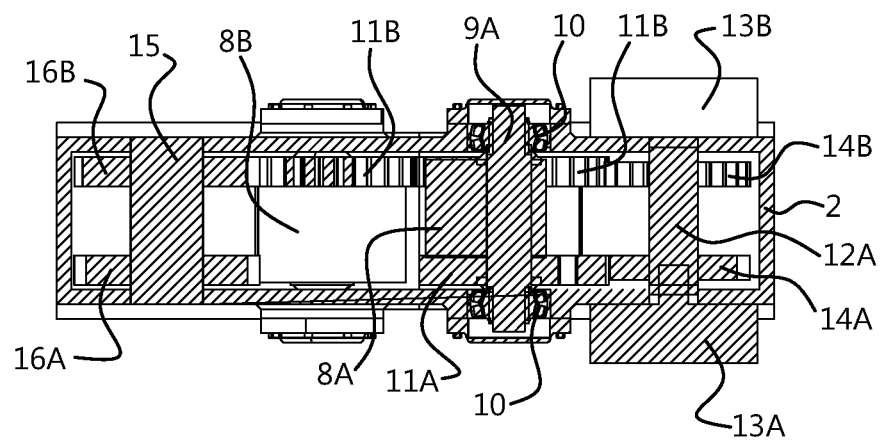
FIG. 4 illustrates a cross section through the line B-B indicated in FIG. 1.
Figure 8:
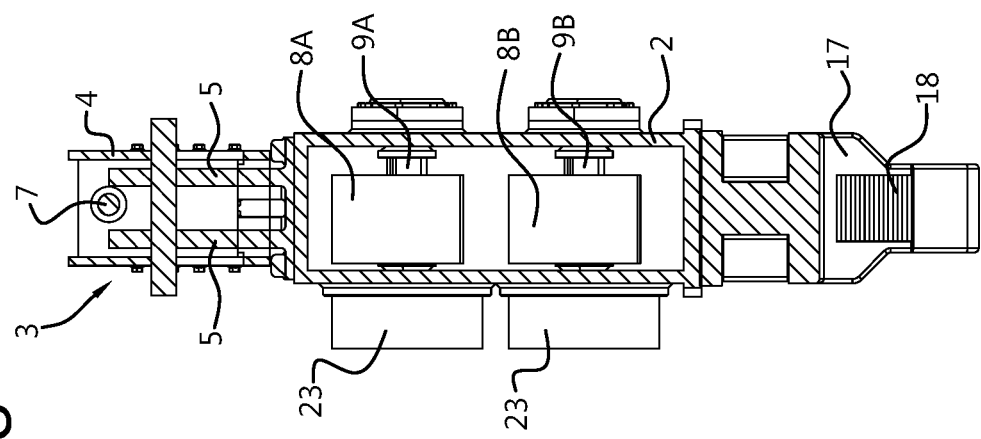
FIG. 8 illustrates a cross section through the line A-A indicated in FIG. 5.
Figure 7:
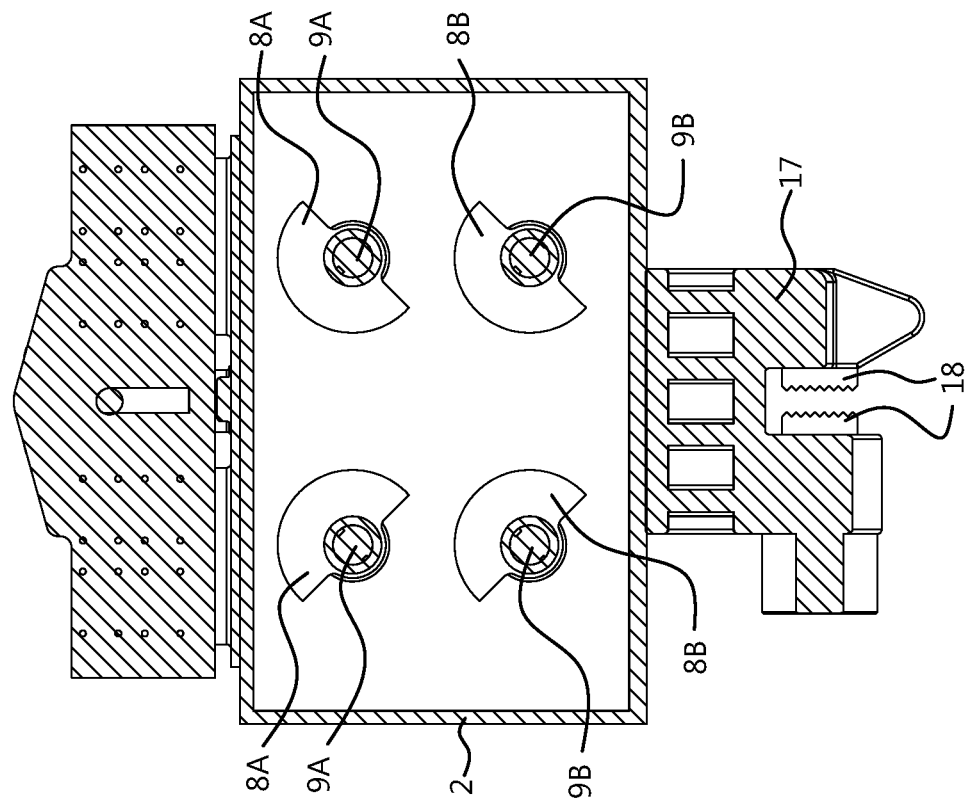
FIG. 7 illustrates a cross section through the line B-B indicated in FIG. 6.

In another possible embodiment, which is a sort of hybrid between the embodiments of FIGS. 1-4 and of FIGS. 5-8, the eccenter weights 8A or 8B of one pair are driven by one motor and are coupled and thus synchronised by gears as is shown in FIG. 3. The phase angle between the pairs can be electronically controlled by the controller instead of using the synchronisation shaft 15, which is thus omitted in such an embodiment.

A frequency drive or an inverter associated with each individual synchronous electric motor 13A, 13B, 23 may be mounted on the vibratory hammer 1, 21 for example on the yoke or on the vibration case. It may also be possible to integrate the frequency drive and inverter in the motor. A higher level control system, which is not located on the vibratory hammer may be connected by wires or wireless with the frequency drive and inverter and may be used to control the speed and synchronisation of the motors 13A, 13B, 23.

The invention claimed is:

1. A vibratory hammer for driving or retracting sheet piles, pipes or other elements into or from soil, said vibratory hammer comprising:
a vibration case;
an even number of pairwise arranged eccenter weights, which are rotationally mounted in the vibration case;
at least one synchronous electric motor as a drive motor for driving the rotation of the eccenter weights;
a clamp attached to the vibration case, said clamp comprising gripping jaws for gripping the sheet piles, pipes or other elements; and
a yoke for suspending the vibratory hammer from a hoist cable or the like, said yoke being connected to the vibration case via one or more vibration damping elements, wherein the at least one synchronous electric motor is a permanent-magnet synchronous motor, specifically a PMSM type motor.

2. The vibratory hammer according to claim 1, wherein the at least one synchronous electric motor is attached to the vibration case.

3. The vibratory hammer according to claim 2, wherein the at least one synchronous electric motor is attached to the vibration case on an outer side of the vibration case.

4. The vibratory hammer according to claim 1, wherein the at least one synchronous electric motor is integrated in an eccenter shaft, wherein stator windings are located inside the eccenter shaft and permanent magnets are arranged around the stator windings inside the eccenter shaft of the eccenter weight.

5. The vibratory hammer according to claim 1, wherein the vibratory hammer comprises four eccenter weights arranged in two pairs one above the other.

6. The vibratory hammer according to claim 1, wherein the eccenter weights of one pair are synchronized by one or more gears.

7. The vibratory hammer according to claim 1, wherein different pairs of eccenter weights are synchronized by one or more gears.

8. The vibratory hammer according to claim 1, wherein each of the eccenter weights is directly driven by one of said at least one synchronous electric motors.

9. The vibratory hammer according to claim 1, wherein each pair of eccenter weights is driven by one of said at least one synchronous electric motors.

10. The vibratory hammer according to claim 1, wherein a frequency drive or an inverter, associated with each individual synchronous electric motor of the at least one synchronous electrical motor, is mounted on the vibratory hammer.

11. The vibratory hammer according to claim 10, wherein the frequency drive and/or inverter is integrated in the at least one synchronous electric motor.

12. The vibratory hammer according to claim 10, wherein an electronic control system is provided which is connected with the frequency drive or inverter of each of the at least one synchronous electric motor so as to control the at least one synchronous electric motor.

13. The vibratory hammer according to claim 12, wherein the control system is configured to electronically control a phase angle between the eccenter weights or pairs of eccenter weights.

14. The vibratory hammer according to claim 12, wherein the control system is configured to provide a proportional control of centrifugal force and speed.

15. The vibratory hammer according to claim 14, wherein the control system is configured to operate at a constant centrifugal force but with a proportional speed and thus vibration frequency.

* * * * *